(12) United States Patent
Berwald et al.

(10) Patent No.: US 7,018,498 B2
(45) Date of Patent: Mar. 28, 2006

(54) PRODUCT AND METHOD FOR MAKING A THREE DIMENSIONAL AMORPHOUS METAL MASS

(75) Inventors: Thomas J. Berwald, Grand Haven, MI (US); Kendall Scott Page, Holland, MI (US)

(73) Assignee: Light Engineering, Inc., Indianapolis, IN (US)

(*) Notice: Subject to any disclaimer, the term of this patent is extended or adjusted under 35 U.S.C. 154(b) by 195 days.

(21) Appl. No.: 10/458,944

(22) Filed: Jun. 11, 2003

(65) Prior Publication Data

US 2004/0250953 A1    Dec. 16, 2004

(51) Int. Cl.
*B29C 69/00* (2006.01)

(52) U.S. Cl. .................. 156/193; 156/305; 310/254; 29/598

(58) Field of Classification Search ................ 156/153, 156/154, 194, 191, 193, 305; 29/596, 598, 29/605, 606, 609; 310/42, 254, 268
See application file for complete search history.

(56) References Cited

U.S. PATENT DOCUMENTS

| | | | |
|---|---|---|---|
| 2,293,951 A | 8/1942 | Seastone et al. | 175/21 |
| 2,495,167 A | 1/1950 | Horstman et al. | 148/14 |
| 2,554,262 A | 5/1951 | Nagel | 154/43 |
| 3,401,287 A | 9/1968 | French | 310/168 |
| 4,621,248 A | 11/1986 | Shigeta et al. | 336/178 |
| 5,028,830 A * | 7/1991 | Mas | 310/211 |
| 6,462,456 B1 * | 10/2002 | DeCristofaro et al. | 310/216 |
| 6,559,570 B1 | 5/2003 | DeCristofaro et al. | |
| 6,803,694 B1 * | 10/2004 | Decristofaro et al. | 310/216 |

FOREIGN PATENT DOCUMENTS

| | | |
|---|---|---|
| DE | 4030124 A | 3/1992 |
| GB | 597218 A | 1/1948 |
| JP | 56104425 A | 8/1981 |

OTHER PUBLICATIONS

DeCristofaro, Nicholas, *Amorphous Metals in Electric-Power Distribution Applications*, Materials Research Society, MRS Bulletin, vol. 23, No. 5, pp. 50-56 (1998).

Rabinkin, Anatol, *Brazing with amorphous foil performs*, reprinted from Jun. 2001 issue of Advanced Materials & Processes.

Van Schevensteen, Raymond et al., *Energy Efficient Distribution Transformer Solutions*, downloaded from www.metglas.com, Jun. 4, 2003.

Rabinkin, Anatol, *Optimization of Brazing Technology, Structural Integrity, and Performance of Multi-Channeled, Three Dimensional Metallic Structures*, downloaded from www.metglas.com, Jun. 4, 2003.

Rabinkin, Anatol, *Overview: Brazing With (NiCoCr)-B-Si Amorphous Brazing Filler Metals: Alloys, Processing Joint Structure, Properties, Applications*, downloaded from www.metglas.com, Jun. 4, 2003.

* cited by examiner

*Primary Examiner*—Jeff H. Aftergut
*Assistant Examiner*—John L. Goff
(74) *Attorney, Agent, or Firm*—Ernest D. Buff & Associates, LLC; Ernest D. Buff; Gordon E. Fish

(57) ABSTRACT

A three dimensional amorphous metal mass suitable for milling is formed wrapping amorphous metal ribbon into a three dimensional shape and then applying adhesive to the three dimensional shape. The adhesive permeates the three dimensional shape. The adhesive is then cured. The three dimensional shape is mechanically contained in three dimensions. If the amorphous metal mass is made as a toroid, then it could be processed into a stator. The stator would then be suitable for use in very high frequency electric motors.

8 Claims, 3 Drawing Sheets

US 7,018,498 B2

PRODUCT AND METHOD FOR MAKING A THREE DIMENSIONAL AMORPHOUS METAL MASS

BACKGROUND OF THE INVENTION

The present invention relates to manufacturing of amorphous metal objects, such as stators.

Multi-pole rotating electrical devices, such as motors and generators, are comprised of rotors and stators. AC motors rotate by producing a rotating magnetic field pattern in the stator that causes the rotor to follow the rotation of this field pattern. As the frequency varies, the speed of the rotor varies. To increase the speed of the motor, the frequency of the input source must be increased.

High frequency motors manufactured with the proper materials can be very efficient. For certain applications, like electric or hybrid cars, highly efficient electric motors are desirable.

The construction of stators for high frequency electric motors is problematic. Iron or steel stators are quite common in electric motors. However, at high frequencies, such as those greater than 400 Hz, iron or steel stators are no longer practical. The high frequency of the AC source increases the core losses of the iron or steel stator, reducing the overall efficiency of the motor. Additionally, at very high frequencies, the stator may become extremely hot and may cause motor failure.

For construction of stators used in high frequency electric motors, amorphous metal would be ideal. Amorphous metal is easy to magnetize and demagnetize, which means a stator made with amorphous metals would have low power loss, low temperature rise at high frequency, extremely fast magnetization (high permeability) and easy conversion of electrical to mechanical energy. A stator made of such an amorphous metal would generate less core losses and be able to operate at much higher frequencies, resulting in motors of exceptional efficiency and power density.

Amorphous metals are commercially produced as ribbon. An example of amorphous metal ribbon is Metglas®, manufactured by Honeywell, Inc. Amorphous metal ribbons are very thin and of varying width. Manufacturing components of amorphous metal ribbon requires winding the amorphous material into a shape and then heat processing the shape. Simple three dimensional shapes, such as toroids, can currently be constructed from amorphous metal ribbon.

However, a stator is not a simple three dimensional shape. The stator has numerous slots for accommodating motor coils milled into a general toroid structure. Manufacturing stators of amorphous metal ribbon presents challenges.

Attempts to create complex three dimensional configurations from amorphous metal ribbon have heretofore been commercially unsuccessful. Various manufacturing techniques have been attempted by industry such as but not limited to: wire electrical discharge machining, electrochemical creep grinding, conventional electrical discharge machining, cutting, stamping, acid etching and fine blanking. None thus far have proven satisfactory for reasons such as cost-effectiveness, manufacturing repeatability, or process cycle time.

This inability to fabricate complex three dimensional shapes from amorphous ribbon has been the significant impediment to producing high efficiency axial flux motors and generators.

A method to produce stators from amorphous ribbon in a cost effective, end use functional, high volume capable method that also provides substantial design flexibility for end use requirements is highly desirable.

SUMMARY OF THE INVENTION

The aforementioned problems are overcome in the present invention. A method for forming a three dimensional amorphous metal mass suitable for milling consists of wrapping amorphous metal ribbon into a three dimensional shape, then applying adhesive to the three dimensional shape. The adhesive is then cured and the cured form is mechanically constrained in three dimensions. The three dimensional amorphous metal so formed can be milled using a horizontal mill, a vertical mill, a computer numeric control (CNC) machine, or any other common milling equipment. Thus, complex three dimensional amorphous metal shapes can be created.

The ability to create three dimensional amorphous metal shapes allows the use of amorphous metal for a variety of applications heretofore foreclosed by the mechanical characteristics of amorphous metal ribbon. For example, to manufacture an amorphous metal stator, amorphous metal ribbon is wound into a toroid. The toroid is then placed in a milling assembly. Adhesive is applied to the toroid, and then cured. The toroid is then milled into a stator shape. Thermally processing the stator shape results in a stator. The amorphous metal stator is useful in many applications, especially high frequency electric motors.

These and other objects, advantages and features of the invention will be more readily understood and appreciated by reference to the detailed description of the drawings.

DETAILED DESCRIPTION OF THE DRAWINGS

Figure 1:
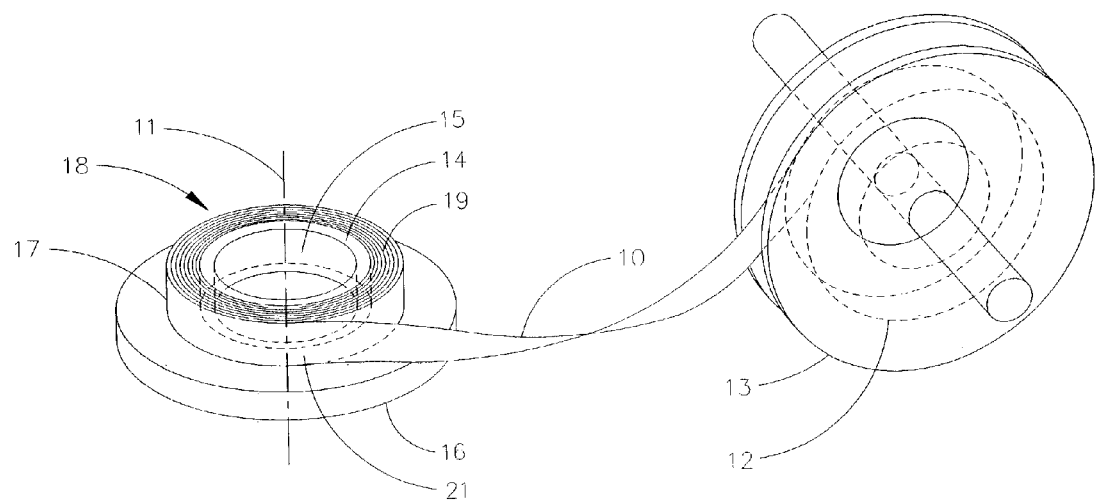
FIG. 1 shows an amorphous metal ribbon being wound on an inner ring.

FIG. 1 shows amorphous metal ribbon 10 being wound about a winding axis 11 on an inner ring 14. Winding machine 13 contains amorphous metal ribbon roll 12. Inner ring 14 is placed on winding plate 16. Inner ring 14 can be a solid ring or a thin steel strip. Amorphous metal ribbon 10 is wound on inner ring 14, forming amorphous metal toroid 18. Amorphous metal toroid 18 has an inner side surface 15, an outer side surface 17, a top 19, and a bottom 21.

While FIG. 1 shows the formation of an amorphous metal toroid 18, it will be appreciated that a three dimensional shape could be created with a geometry distinctly different from the amorphous metal toroid 18. For example, it would be possible by winding around four corners to create a rectangular prism.

Amorphous metal ribbon 10 can be wound using a variety of machines and methods. Preferably, a consistent, firm toroid will have at least an 85% wind density compared to the inherent ribbon density. Amorphous metal toroid 18 is then removed from winding plate 16. Amorphous metal ribbon 10 can be wound around the inner ring 14 while attached to the inner containment hat 20 as a single unit.

An adhesive is then applied to the amorphous ribbon toroid 18 in a manner to permeate the amorphous metal toroid 18. Inner ring 14 is still contained within the amorphous ribbon toroid 18. A suitable adhesive is Scotch Cast adhesive by 3M, diluted by acetone so as to achieve about a 20% mix by volume. The adhesive is applied to amorphous ribbon toroid 18 by an ambient atmospheric soak process. Amorphous ribbon toroid 18 is immersed in the adhesive until the adhesive infiltrates the layers.

Alternatively, the adhesive could be applied by immersing amorphous ribbon toroid 18 into the adhesive inside a vessel that is evacuated of air. The vacuum created would enhance the infiltration of the adhesive into the amorphous ribbon toroid 18 layers. Alternative resins, epoxies or adhesives may be used. Different brands as well as different types of resins, epoxies or adhesives may be used. Heat cured epoxies that require various temperatures as well a two stage epoxies that cure at room temperature would also be suitable.

After amorphous ribbon toroid 18 is sufficiently infiltrated with adhesive, amorphous ribbon toroid 18 is allowed to drain. Once dry, amorphous ribbon toroid 18 is placed inside an oven for curing. Importantly, the temperature for heat curing the adhesive be a fraction of the temperature for heat processing amorphous metal ribbon 10. A preferable fraction is ½, although fractions of ¼ and ¾ might also be satisfactory.

Figure 2:
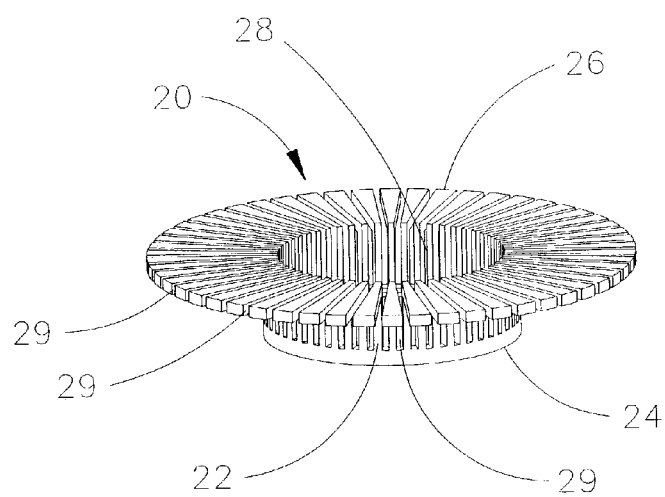
FIG. 2 shows an inner containment hat.

FIG. 2 shows inner containment hat 20. Inner containment hat 20 is a cylinder comprised of a number of columns 22 extending upward from the inner containment hat base 24. Fingers 26 extend outward from columns 22 at approximately a right angle. Fingers 26 increase in width as they extend further from the columns 22. Fingers 26 are arranged in a circle, forming an annulus 28. The columns 22 and fingers 26 form a plurality of inner containment hat grooves 29.

Columns 22 of inner containment hat 20 are placed inside inner ring. The height of columns 22 is approximately equal to the height of the amorphous metal toroid 18. The internal diameter of the amorphous metal toroid 18 is about equal to the outer diameter of the inner ring 14.

Figure 3:
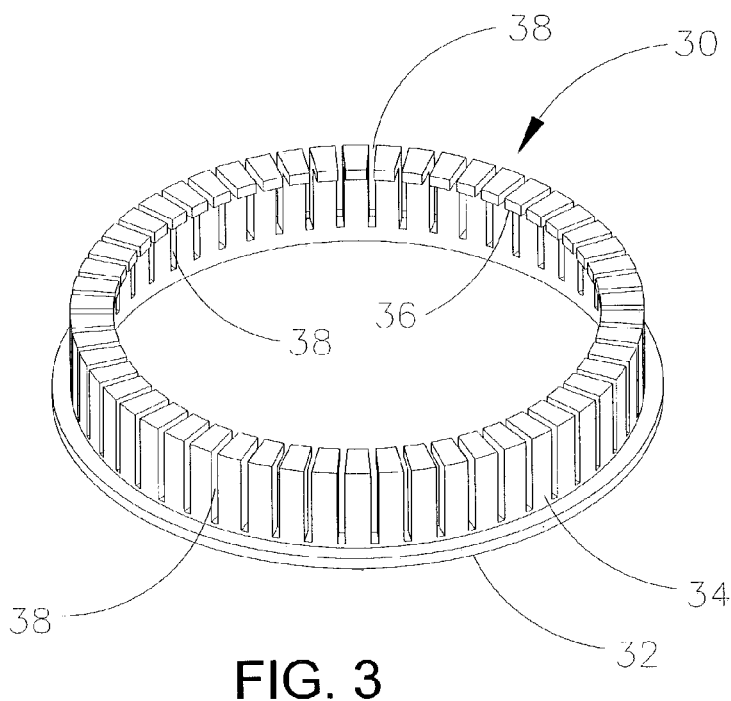
FIG. 3 shows an outer containment hat.

Following the placement of inner containment hat within amorphous metal toroid 18, outer containment hat 30 shown in FIG. 3, is placed around amorphous metal toroid 18. Outer containment hat 30 is cylindrical, with a base 32. Bars 34 extend upward from base 32. At the top of each bar 34 is a lug 36 extending inward. Lug 36 for each bar 34 forms a flange for securing the amorphous metal toroid 18 within outer containment hat 30. Bars 34 and lugs 36 form a plurality of outer containment hat grooves 38.

Figure 4:
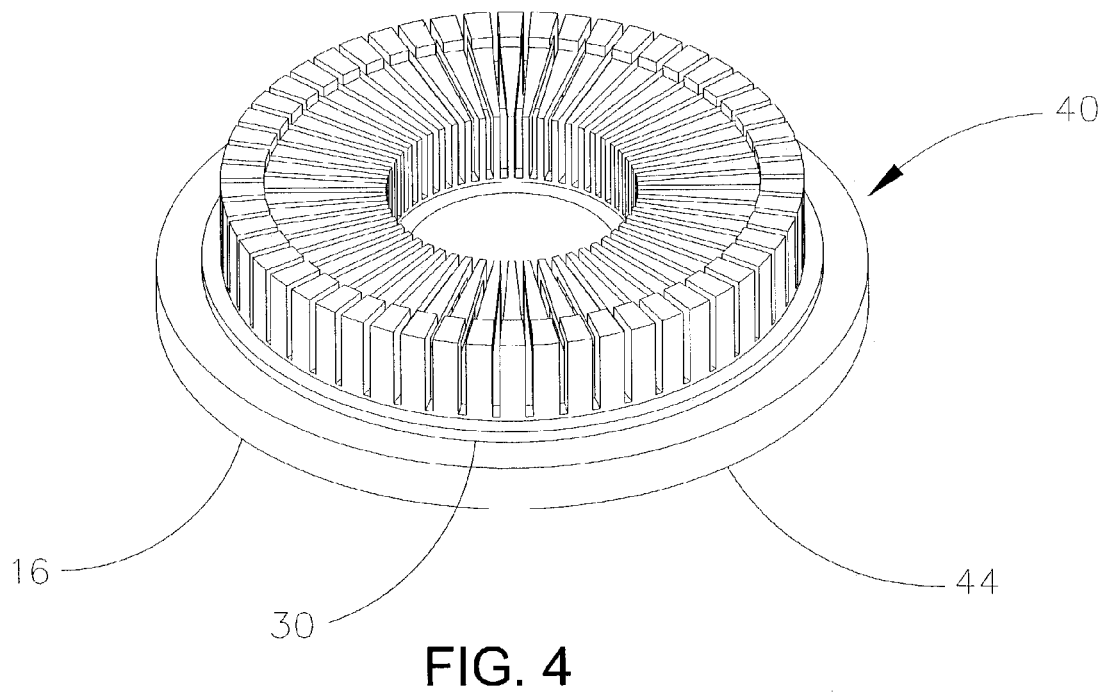
FIG. 4 shows a milling assembly.

Milling assembly 40, shown in FIG. 4, is then formed. Amorphous metal toroid 18, still containing inner ring 14, along with the inner containment hat 20 is placed within outer containment hat 30. Lugs 36 and fingers 26 are aligned. Milling assembly 40 contains the amorphous metal toroid 18 within a toroidal geometry. Alternatively, amorphous metal toroid 18 could be placed within outer containment hat 30 and inner containment hat 20 prior to treatment with the adhesive.

After application of the adhesive and placement within the mechanical constraints of the inner ring 14, inner containment hat 20, and outer containment hat 30, the amorphous metal toroid 18 has sufficient structural integrity to withstand the stresses of milling.

Milling plate 44 is placed on the bottom of the amorphous metal toroid 18. Milling plate 44 could be the same as winding plate 16.

Amorphous metal toroid 18, having been treated with an adhesive, is thus firmly contained within a structure, allowing amorphous metal toroid 18 to be milled and formed in three dimensions. Complex shapes can thus be constructed from the metal ribbon toroid 18, allowing structures such as stators to be made from the amorphous metal toroid 18.

Figure 5:
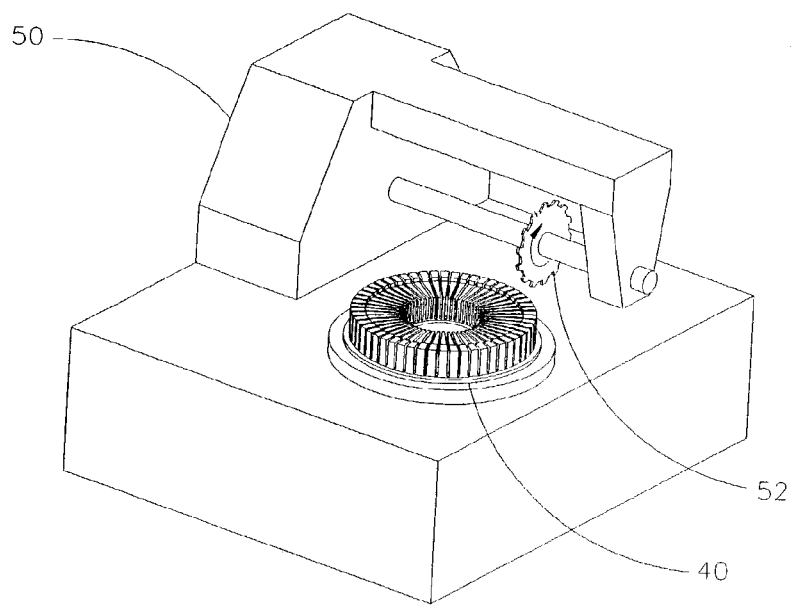
FIG. 5 shows a milling assembly being milled.

As illustrated by FIG. 5, milling assembly 40 is placed in mill 50. Mill 50 could be a horizontal mill, a vertical mill, a computer numeric control (CNC machine, or any other type of mill. However, mill 50 should preferably have the axis of rotation of the mill tools 52 perpendicular to the axis of the amorphous metal toroid 18. By having the axis of rotation of the mill tool 52 perpendicular to the axis of the amorphous metal toroid 18, the depth and width of the slots milled into the amorphous metal toroid 18 can be finely controlled.

Mill 50 cuts slots or other geometries into the amorphous metal toroid 18. Inner ring 14, still contained within amorphous metal toroid 18, acts as a positive mechanical stop for the inside edge of amorphous metal toroid 18. Inner ring 14, in conjunction with the epoxy, does not allow strips of amorphous metal ribbon 10 to separate during machining, thereby producing clean and accurate cuts. It also should be noted that an outer containment ring with the same function of inner ring 14 could be employed to facilitate the milling of slots across the entire diameter of the toroid by not allowing strips of amorphous metal ribbon to separate as the cutter exits the toroid.

After the amorphous metal toroid 18 is milled into a stator shape, milling assembly 40 is removed from mill 50. Milling assembly 40 is then thermally processed in accordance with the recommendations of the manufacturer of amorphous metal ribbon 10. If the amorphous metal ribbon 10 is Metglas®, thermal processing consists of placing milling assembly 40 into a vacuum furnace at 695 degrees Fahrenheit for a thermal processing cycle that is approximately 4 hours in duration where the milling assembly reaches the desired 695 degrees Fahrenheit for at least sixty minutes.

Following thermal processing, the milling assembly 40 is disassembled by removing outer containment hat 30, inner containment hat 20, and inner ring 14. A lacquer or varnish is applied to prevent rust and tack the layers for handling purposes.

Figure 6:
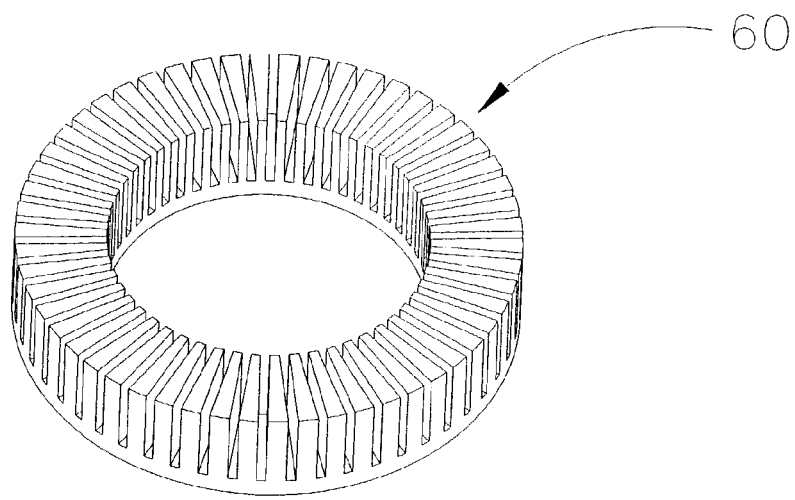
FIG. 6 shows an amorphous metal stator.

Amorphous metal toroid 18 has thus been made into an amorphous metal stator 60, shown in FIG. 6. Amorphous metal stator 60 can hold numerous windings. Since it is made of an amorphous metal, it has significantly enhanced magnetic characteristics, making it ideal for use in high efficiency motors.

The process described above can be readily used in mass production of amorphous metal stators. Further, the time and cost for manufacturing the stator are sufficiently low to allow mass production of the stator.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. A method for manufacturing an amorphous metal stator, comprising the steps of:

winding amorphous metal ribbon into a toroid having an inner side surface, an outer side surface, a top, and a bottom;

containing the toroid within a milling assembly, the step of containing the toroid comprising the steps of:
   placing an inner ring circumferentially about substantially all of the inner side surface;
   placing an outer ring circumferentially about at least a portion of the outer side surface; and
   placing a hat on at least a portion of the top;
providing milling grooves within the milling assembly;
applying an adhesive to the toroid;
curing the adhesive;
milling the toroid contained within the milling assembly into a stator shape; and
thermally processing the stator shape into a stator.

2. A method for manufacturing an amorphous metal stator, comprising the steps of:
   winding amorphous metal ribbon into a toroid having an inner side surface, an outer side surface, a top, and a bottom;
   containing the toroid within a milling assembly, the step of containing the toroid comprising the steps of:
      placing an inner ring circumferentially about at least a portion of the inner side surface;
      placing an outer ring circumferentially about at least a portion of the outer side surface; and
      placing a hat on at least a portion of the top;
   applying an adhesive to the toroid;
   curing the adhesive;
   milling the toroid contained within the milling assembly into a stator shape; and
   thermally processing the stator shape into a stator;
   wherein the hat, outer ring and inner ring are integral and the hat and outer ring have slots, and the step of milling the toroid into a stator shape includes milling through the slots.

3. A method for manufacturing an amorphous metal stator, comprising the steps of:
   winding amorphous metal ribbon into a toroid having an inner side surface, an outer side surface, a top, a bottom, and a winding axis;
   containing the toroid within a milling assembly, the step of containing the toroid comprising the steps of:
      placing an inner ring circumferentially about at least a portion of the inner side surface;
      placing an outer ring circumferentially about at least a portion of the outer side surface; and
      placing a hat on at least a portion of the top;
   applying an adhesive to the toroid;
   curing the adhesive;
   milling the toroid contained within the milling assembly into a stator shape; and
   thermally processing the stator shape into a stator;
   wherein the hat, outer ring, and inner ring are integral and the hat and outer ring have slots, and the step of milling the toroid into a stator shape includes milling through the slots with a cutting tool rotating primarily in an axis perpendicular to the winding axis.

4. A method for manufacturing an amorphous metal stator comprising the steps of:
   winding amorphous metal ribbon about a winding axis into a toroid, the toroid having an inner side, an outer side, a top and a bottom;
   placing an inner ring on the inner side;
   placing an inner containment hat on the top and inner side;
   placing an outer containment hat on the top and outer side;
   placing a retainer around the outer containment hat;
   applying adhesive to the toroid;
   curing the adhesive;
   milling the toroid into a stator shape; and
   thermally processing the stator shape into a stator.

5. The method of claim 4 where the inner containment hat has a plurality of inner containment hat slots and the outer containment hat has a plurality of outer containment hat slots, and the step of milling the toroid into a stator shape comprises milling through the plurality of inner containment hat slots and the plurality of outer containment hat slots.

6. The method of claim 5 including a step of aligning the plurality of inner containment hat slots and the plurality of outer containment hat slots.

7. The method of claim 4 where the step of milling the toroid into a stator shape occurs primarily on an axis perpendicular to the winding axis.

8. The method of claim 4 where the step of milling the toroid into a stator shape occurs exclusively on an axis perpendicular to the winding axis.

* * * * *